United States Patent
Lim (10) Patent No.: US 8,279,233 B2
(45) Date of Patent: Oct. 2, 2012

(54) SYSTEM FOR RESPONSE SPEED COMPENSATION IN LIQUID CRYSTAL DISPLAY USING EMBEDDED MEMORY DEVICE AND METHOD OF CONTROLLING FRAME DATA OF IMAGE

(75) Inventor: Jung-hyun Lim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1283 days.

(21) Appl. No.: 12/002,044

(22) Filed: Dec. 13, 2007

(65) Prior Publication Data

US 2008/0192061 A1 Aug. 14, 2008

(30) Foreign Application Priority Data

Feb. 9, 2007 (KR) .................. 10-2007-0013798

(51) Int. Cl.
- *G09G 5/36* (2006.01)
- *G06F 13/18* (2006.01)
- *G06F 13/00* (2006.01)

(52) U.S. Cl. ........ 345/558; 345/532; 345/537; 345/555; 345/204

(58) Field of Classification Search .................. 345/532, 345/537, 555, 558, 204
See application file for complete search history.

(56) References Cited

U.S. PATENT DOCUMENTS

| | | | |
|---|---|---|---|
| 7,206,003 B2 | 4/2007 | Nose et al. | |
| 7,586,485 B2 | 9/2009 | Teshirogi et al. | |
| 7,660,010 B2 | 2/2010 | Furihata et al. | |
| 2004/0013316 A1* | 1/2004 | Park et al. | 382/276 |
| 2004/0080521 A1 | 4/2004 | Nose et al. | |
| 2005/0140686 A1* | 6/2005 | Kwon | 345/560 |
| 2005/0253833 A1 | 11/2005 | Teshirogi et al. | |
| 2005/0264574 A1* | 12/2005 | Shimomura et al. | 345/531 |
| 2006/0152501 A1 | 7/2006 | Furihata et al. | |

FOREIGN PATENT DOCUMENTS

| | | |
|---|---|---|
| JP | 6-59648 | 3/1994 |
| JP | 2004-157526 | 6/2004 |
| JP | 2005-326633 | 11/2005 |
| JP | 2006-184448 | 7/2006 |
| JP | 2006-195151 | 7/2006 |
| JP | 2006-267430 | 10/2006 |
| KR | 2003-0065816 | 8/2003 |
| KR | 10-2006-0019908 | 3/2006 |

* cited by examiner

*Primary Examiner* — Seokyun Moon
(74) *Attorney, Agent, or Firm* — Onello & Mello, LLP (57) ABSTRACT

Provided are a system for compensating response speed and a method of controlling frame data of an image. The system includes: a circuit for compensating response speed; an internal frame memory that comprises N sub frame memories formed in a single chip with the circuit for compensating response speed, wherein N is a natural number; a frame memory controller that comprises N sub frame memory controllers corresponding to each sub frame memory; and a data flow controller that comprises N write first-in-first-out (FIFO) circuits and N read FIFO circuits corresponding to each sub frame memory.

20 Claims, 8 Drawing Sheets

SYSTEM FOR RESPONSE SPEED COMPENSATION IN LIQUID CRYSTAL DISPLAY USING EMBEDDED MEMORY DEVICE AND METHOD OF CONTROLLING FRAME DATA OF IMAGE

CROSS-REFERENCE TO RELATED PATENT APPLICATION

This application claims the priority under 35 U.S.C. §119 to Korean Patent Application No. 10-2007-0013798, filed on Feb. 9, 2007, in the Korean Intellectual Property Office, the disclosure of which is incorporated herein in its entirety by reference.

BACKGROUND OF THE INVENTION

1. Field of the Invention

The present invention relates to a liquid crystal display, and more particularly, to a system for compensating response speed and a method of controlling frame data of an image in which response speed of a, liquid crystal can be increased by using an embedded frame memory, not an external frame memory.

2. Description of the Related Art

Recently, liquid crystal displays have been used as displays not only in personal computers but also in high-definition televisions. Accordingly, the response speed of a liquid crystal reacting according to applied image data voltage should be quick in order for the liquid crystal displays to operate well in a multimedia environment.

However, most liquid crystals have a response speed that is faster than the speed of receiving image data of 1 frame. For example, when data of 60 frames is displayed on a screen for 1 second, at least 16.6 ms is consumed for a liquid crystal panel to change to a liquid crystal state corresponding to the image data voltage. Accordingly, a circuit for compensating response speed is used.

A dynamic capacitance compensation (DCC) circuit is generally used as the circuit for compensating response speed. The DCC circuit improves the response speed of a liquid crystal by comparing voltages of a current image and a previous image, and outputting frame data of an image having a bigger or smaller gray voltage level than the current image based on the result of comparing the voltages.

Figure 1:
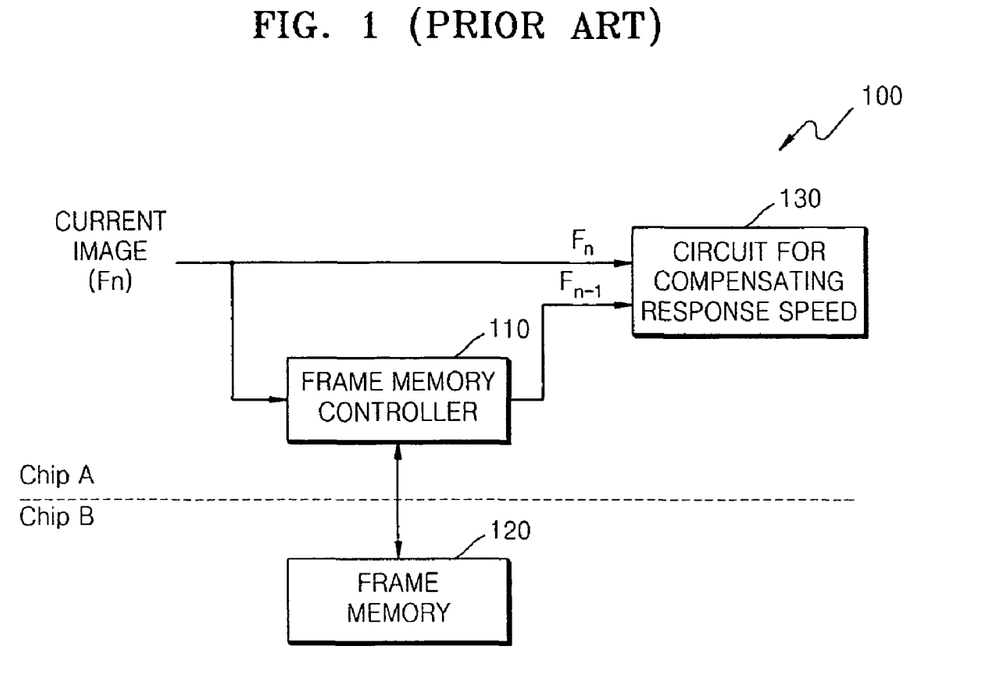
FIG. 1 is a block diagram illustrating a prior art system for compensating response speed.

FIG. 1 is a block diagram illustrating a prior art system 100 for compensating response speed. System 100 for compensating response speed includes a frame memory controller 110, a frame memory 120, and a circuit 130 for compensating response speed.

The frame memory controller 110 receives a current image Fn from an external graphic source (not shown) and transmits the current image Fn to the frame memory 120. Also, the frame memory controller 110 receives a previous image Fn−1 from the frame memory 120 and transmits the previous image Fn−1 to the circuit 130 for compensating response speed.

The frame memory 120, which is controlled by the frame memory controller 110, stores the current image Fn received from the frame memory controller 110 and outputs the previous image Fn−1 stored in the frame memory 120. The current image Fn and the previous image Fn−1 are images having only a temporal difference.

The frame memory 120 exists to supply the previous image Fn−1 to the circuit 130 for compensating response speed, and is formed of a chip B, which is different from a chip A forming the frame memory controller 110 and the circuit 130 for compensating response speed.

The circuit 130 for compensating response speed receives the current image Fn from the external graphic source and receives the previous image Fn−1 from the frame memory controller 110. The circuit 130 for compensating response speed compares voltages of the received current image Fn and the previous image Fn−1, and compensates the response speed of a liquid crystal correspondingly to the result of compared the voltages.

The circuit 130 for compensating response speed can be a DCC circuit that includes a look-up table for a changing gray voltage of the current image Fn.

A liquid crystal display processes data according to the speed of receiving the current image Fn. Meanwhile, as the definition of the current image Fn increases, the speed of receiving data also increases, and thus, as the definition of the current image Fn increases, the processing speed of the circuit 130 for compensating response speed should also increase. Consequently, as the definition increases, the operating speed and capacity of the frame memory 120 should increase. Accordingly, a system for compensating response speed using a compressing/restoring method has been developed.

Figure 2:
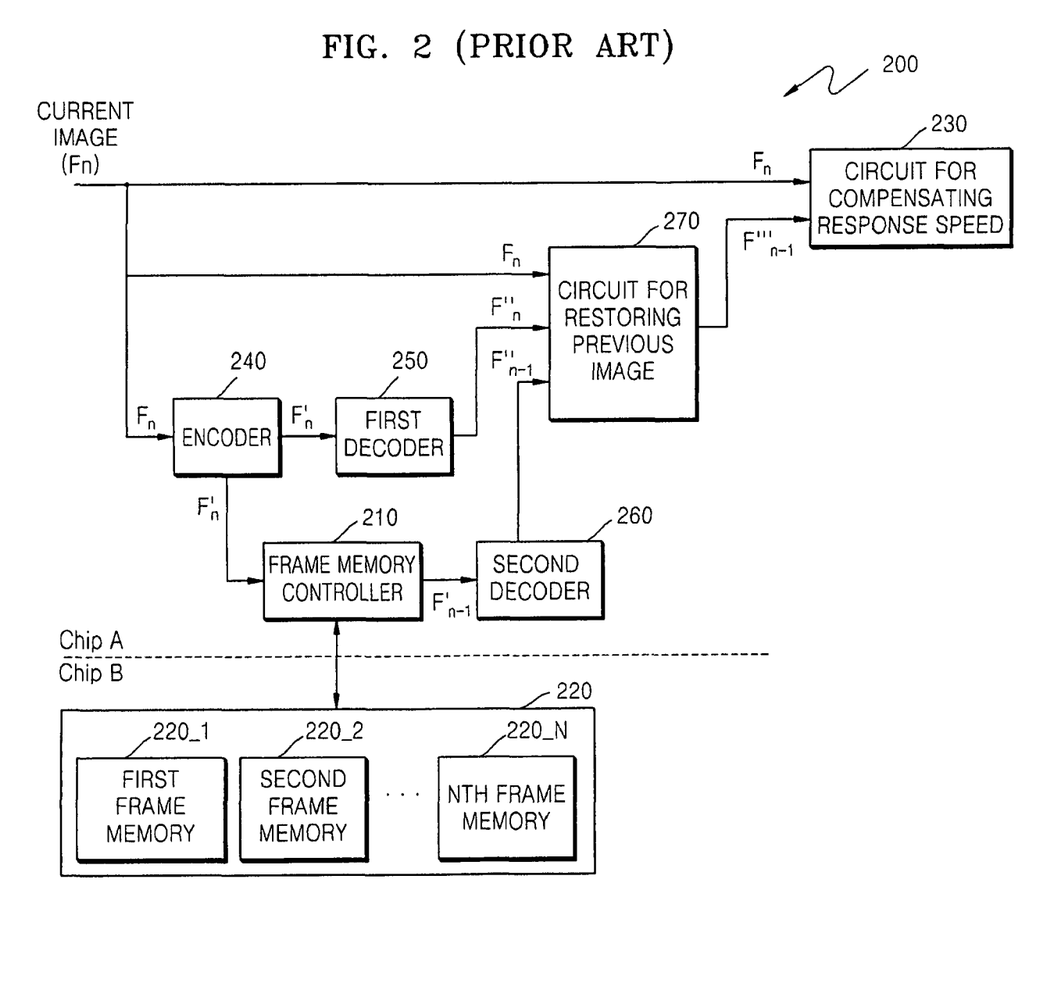
FIG. 2 is a block diagram illustrating a system for compensating response speed using a prior art compressing/restoring method.

FIG. 2 is a block diagram illustrating a system 200 for compensating response speed using a prior art compressing/restoring method.

The system 200 for compensating response speed using the prior art compressing/restoring method includes a frame memory controller 210, a frame memory 220, a circuit 230 for compensating response speed, an encoder 240, a first decoder 250, a second decoder 260, and a circuit 270 for restoring a previous image.

The encoder 240 generates a compressed current image F'n by compressing a current image Fn received from an external graphic source (not shown). The first decoder 250 generates a restored current image F'''n by restoring the compressed current image F'n received from the encoder 240.

The frame memory controller 210 transmits the compressed current image F'n, received from the encoder 240, to the frame memory 220, and transmits a compressed previous image F'n−1, received from the frame memory 220, to the second decoder 260.

The second decoder 260 generates a restored previous image F'''n−1 by restoring the compressed previous image F'n−1 received from the frame memory controller 210.

The circuit 270 for restoring a previous image generates a similar previous image F''''n−1 by receiving the current image Fn, the restored current image F'''n, and the restored previous image F'''n−1. The similar previous image F''''n−1 is an image from which noise of the restored previous image F'''n−1 is removed.

The circuit 230 for compensating response speed compares voltages of the current image Fn and the similar previous image F''''n−1, changes a gray voltage of the current image Fn according to the result of comparing the voltages, and outputs the changed gray voltage of the current image Fn.

Meanwhile, using the prior art compressing/restoring method, the amount of image data that can be transmitted via the same data bus width increases, and, thus, the operating speed of the frame memory 220 can be increased. Also, since compressed data is stored in the frame memory 220, memory capacity can also be increased. The memory capacity can be increased more, by forming the frame memory 200 of a plurality of sub frame memories 220_1 through to 220_N.

However, the system 200 uses the external frame memory 220 formed of a separate chip, not a system on chip (SoC). As a result, as the number of sub frame memories 220_1 through to 220_N increases, the number of data bus pins required also increases.

When the number of data bus pins increases, the size of the entire system increases. Also, an RC delay, caused by an increase of a load cap between bus lines or between a bus line and a pin, also increases.

SUMMARY OF THE INVENTION

In accordance with aspects of the present invention, there is provided a system for compensating response speed that can flexibly accommodate increasing definition of an image, by using an embedded memory as a frame memory required in the system.

Also in accordance with aspects of the present invention, there is provided a method of controlling image frame data, which can efficiently write and read the image frame data to/from an embedded memory used in a system for compensating response speed.

According to an aspect of the present invention, there is provided a response speed compensating system for, the system including: a circuit for compensating response speed configured to compare voltages of a current image and a previous image received from an external source, the circuit configured to change a gray voltage of the current image based on a result of the voltage comparison, and to output the gray voltage; an internal frame memory configured to store the current image and output the previous image in response to a control signal, and the internal frame memory comprising N sub frame memories formed in a single chip with the circuit for compensating response speed, wherein N is a natural number; a frame memory controller configured to generate the control signal in order to store the current image in the internal frame memory or output the previous image from the internal frame memory, the frame memory controller comprising N sub frame memory controllers corresponding to each sub frame memory; and a data flow controller configured to transmit the current image to the frame memory controller, transmit the previous image to the circuit for compensating response speed, the data flow controller comprising N write first-in-first-out (FIFO) circuits and N read FIFO circuits corresponding to each of the N sub frame memories.

The system can further include: an encoder configured to generate a compressed current image by compressing the current image; and a first decoder which generates a restored previous image by restoring a compressed previous image, wherein the current image inputted to the internal frame memory, the frame memory controller, and the data flow controller is the compressed current image, and the previous image outputted from the internal frame memory, the frame memory controller, and the data flow controller is the compressed previous image.

The data flow controller can further include a circuit for assigning an order of compression data, wherein the circuit is configured to divide the compressed current image into a plurality of data groups according to an input order, and to generate an FIFO enable signal in order to sequential input the data groups to the write FIFO circuits.

The circuit for assigning an order of compression data can be configured to divide the compressed current image into the plurality of data groups based on the data bus width of the compressed current image inputted to the data flow controller.

The data bus width can be 32 bits or 64 bits.

The data flow controller can configured to output the compressed current image to the corresponding sub frame memory controller, when the compressed current image stored in the write FIFO circuit exceeds a predetermined value.

The write FIFO circuit can include: an static random access memory (SRAM) configured to store the compressed current image; a first counter configured to count an input number of data groups inputted; a second counter configured to count an output number of data groups are outputted; a comparator configured to compare the difference between the input number and the output number with a reference value; and an SRAM controller configured to control operations of the SRAM based on the result of the difference comparison.

The reference value can be ½ of a maximum number of data groups that can be stored in the SRAM.

The data flow controller can further include: a multiplexer configured to receive the compressed previous image outputted from the N read FIFO circuits, and to sequentially outputs the compressed previous image in response to an output data selection signal received via the bus line; and a circuit for assigning an order of restoration data configured to assign an output order of the compressed previous image inputted to the multiplexer and to generate the output data selection signal corresponding to the output order.

The system can further include: a second decoder configured to output a restored current image by restoring the compressed current image outputted from the encoder; and a circuit configured to restore a previous image that generates a similar previous image by using the current image, the restored current image, and the restored previous image, wherein the circuit for compensating response speed is configured to compare voltages of the current image and similar previous image.

The frame memory controller can be formed on the single chip with the circuit for compensating response speed and the internal frame memory.

The circuit for compensating response speed can be a dynamic capacitance compensation (DCC) circuit.

The DCC circuit can comprise a look-up table configured to output the current image by changing the current image based on the result of voltage comparison.

According to another aspect of the present invention, there is provided a method of controlling frame data of an image, the method including: storing a current image in N write FIFO circuits connected in parallel after dividing the current image into a plurality of data groups based on data bits simultaneously inputted via a bus line; storing the current image in N sub frame memories by outputting the current image from each of the N write FIFO circuits to a corresponding one of the N sub frame memories, when the current image stored in the N write FIFO circuits exceeds a predetermined value; and storing a previous image in N read FIFO circuits connected in parallel by outputting the previous image from the N sub frame memories in response to an output data selection signal, wherein N is a natural number.

The storing of the current image in the corresponding N sub frame memories can be performed by N sub frame memory controllers corresponding to each of the N write FIFO circuits.

The storing of the previous image in the N write FIFO circuits can include: assigning a write FIFO circuit in which each data group from the plurality of data groups is to be stored; and sequentially storing each data group in a corresponding write FIFO circuit using an FIFO enable signal.

The method can further include: counting an input number of data groups inputted in the write FIFO circuit; counting an output number data groups outputted from the write FIFO circuit; determining whether the difference between the input number and the output number is bigger than a predetermined reference value; and determining whether to output of the data group stored in the write FIFO circuit based on the result of the determination.

Determining whether to output the data group stored in the write FIFO circuit based on the result of the determination can include: storing the data group in the write FIFO circuit when the difference is equal to or less than the predetermined reference value; and outputting the data group stored in the write FIFO circuit when the difference exceeds the predetermined reference value.

The method can further include: outputting a write preparation signal, indicating that preparation for recoding the data group in the corresponding sub frame memory is complete, when the plurality of data groups stored in the write FIFO circuit exceeds a predetermined value; and outputting a write approval signal, indicating that the data group can be written in the corresponding sub frame memory, in response to the write preparation signal.

The method can further include: outputting the data group stored in the write FIFO circuit instead of storing the data group in the write FIFO circuit, when the write approval signal is activated; and storing the data group in the write FIFO circuit instead of outputting the data group stored in the write FIFO circuit, when the write approval signal is deactivated.

The method can further include: outputting a read preparation signal indicating that preparation for reading the previous image stored in each sub frame memory is complete; and outputting a read approval signal indicating-whether the frame data of a previous data can be read from the sub frame memory in response to the read preparation signal.

The method can further include: outputting the previous image stored in the sub frame memory to the corresponding read FIFO circuit when the read approval signal is activated; and outputting the read preparation signal instead of outputting the previous image stored in the sub frame memory when the read approval, signal is deactivated.

The method can further include: counting an input number the data groups inputted to the read FIFO circuit; counting an output number of data groups outputted from the read FIFO circuit; determining whether the difference between the input number and the output number is bigger than a predetermined reference value; and determining whether to output the data group stored in the sub frame memory based on the result of determination.

Determining whether to output the data group stored in the sub frame memory based on the result of determination can include: storing the data group in the read FIFO circuit when the difference is equal to or below the predetermined reference value; and deactivating the read preparations signal and outputting the data group stored in the read FIFO circuit to the multiplexer when the difference exceeds the predetermined reference value.

The method can further include: assigning an order of outputting the data groups inputted to the multiplexer; generating the output data selection signal corresponding to the assigned order; and outputting the data groups inputted to the multiplexer based on the output data selection signal.

BRIEF DESCRIPTION OF THE DRAWINGS

The above and other features and advantages of the present invention will become more apparent by describing in detail exemplary embodiments thereof with reference to the attached drawings, in which like reference numerals refer to the same or similar elements. In the drawings.

DETAILED DESCRIPTION OF THE INVENTION

Hereinafter, aspect of the present invention will be described more fully with reference to the accompanying drawings, in which exemplary embodiments are shown. While describing these embodiments, detailed descriptions of well-known items, functions, or configurations are typically omitted for conciseness.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 3:
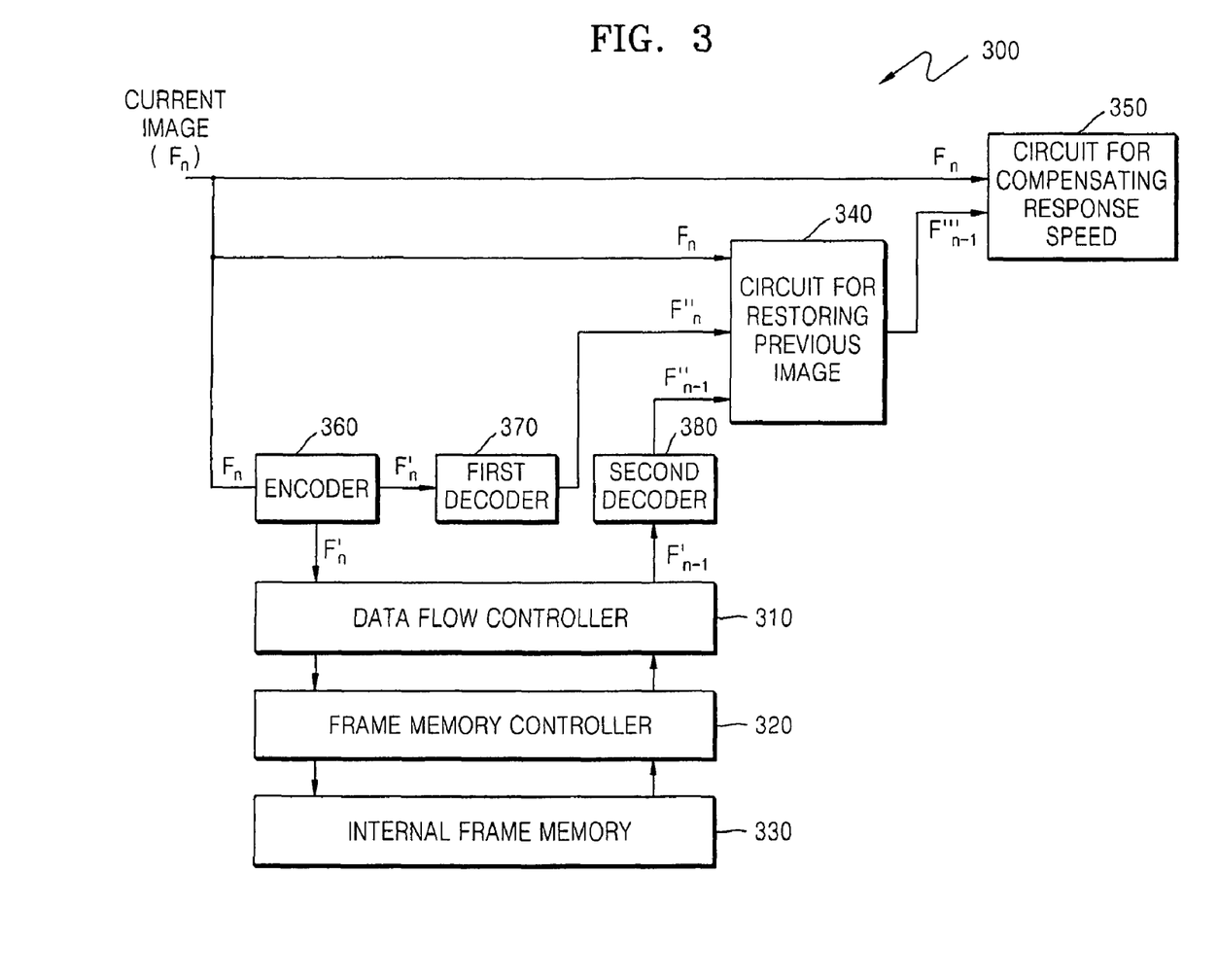
FIG. 3 is a block diagram illustrating an embodiment of a system for compensating response speed according to an aspect of the present invention.

FIG. 3 is a block diagram illustrating an embodiment of a response speed compensating system 300 according to an aspect of the present invention.

The system 300 according to the current embodiment includes a data flow controller 310, a frame memory controller 320, an internal frame memory 330, a circuit 340 for restoring a previous image, a circuit 350 for compensating response speed, an encoder 360, a first decoder 370, and a second decoder 380.

The data flow controller 310 transmits a compressed current image F'n received from the encoder 360 to the frame memory controller 320, and transmits a compressed previous image F'n−1 received from the frame memory controller 320 to the second decoder 380.

The data flow controller 310 can be formed of a plurality of write first-in-first-out (FIFO) circuits and a plurality of read FIFO circuits. One write FIFO circuit and one read FIFO circuit form a pair. The numbers of write FIFO circuits and read FIFO circuits correspond to the number of frame memories in the internal frame memory 330.

The internal frame memory 330 is realized on the same chip as the frame memory controller 320 and the circuit 350 for compensating response speed. That is, the internal frame memory 330 is realized on a system on chip (SoC). Since the internal frame memory 330 and the frame memory controller 320 are realized on the same chip, the required number of bus lines and pins can be remarkably reduced.

In this embodiment, the functions and operations of the circuit 340 for restoring a previous image, the circuit 350 for compensating response speed, the encoder 360, the first decoder 370, and the second decoder 380 are the same as the functions and operations of the constituents of the system for compensating response speed illustrated in FIG. 2, and thus the descriptions thereof are omitted here.

Figure 4:
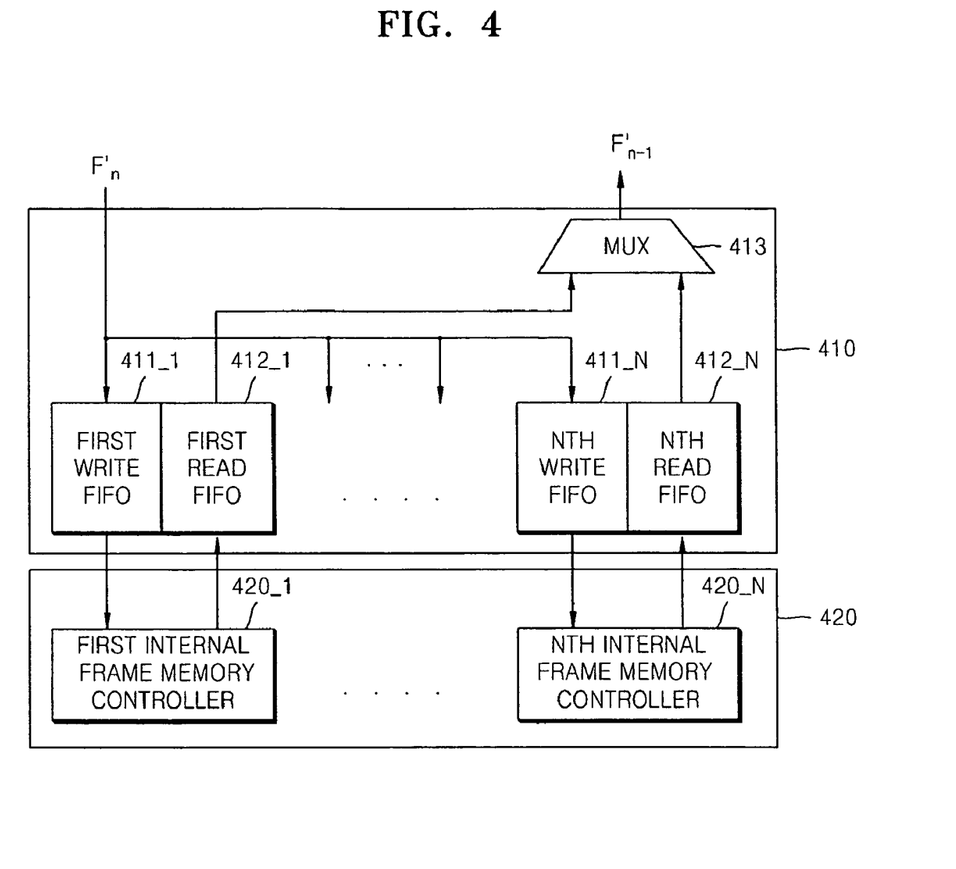
FIG. 4 is a block diagram illustrating an embodiment of a data flow controller according to an aspect of the present invention.

FIG. 4 is a block diagram illustrating an embodiment of a data flow controller 410 according to an aspect of the present invention. As an example, the data flow controller 310 of FIG. 3 can take the form of data flow controller 410 of FIG. 4.

The data flow controller 410 according to the current embodiment includes N write FIFO circuits 411_1 through to 411_$n$, N read FIFO circuits 412_1 through to 412_N, and a multiplexer 413, wherein N is a natural number.

The write FIFO circuit 411_1 and the read FIFO circuit 412_1 form one pair, and are electrically connected to a corresponding first sub frame memory controller 420_1. Similarly, the write FIFO circuit 411_N and the read FIFO circuit 412_N form one pair, and are electrically connected to a corresponding Nth sub frame memory controller 420_N.

After receiving the compressed current image F'n, the write FIFO circuit 411_1 transmits the compressed current image F'n to the corresponding first sub frame memory controller 420_1. Similarly, after receiving the compressed current image F'n, the write FIFO circuit 411_N transmits the compressed current image F'n to the corresponding Nth sub frame memory controller 420_N.

Each of the write FIFO circuits 411_1 through to 411_N continuously receives and stores a part of the data of an image, from among the data of the compressed current image, and outputs the part of data of an image to the corresponding first through Nth sub frame memory controllers 420_1 through to 420_N when the stored data of an image exceeds a predetermined value.

The write FIFO circuits 411_1 through to 411_N are connected in parallel and are controlled by a predetermined control signal. Accordingly, it is convenient to install more sub frame memories (not shown). Also, since each of the sub frame memory controllers 420_1 through to 420_N independently operates, the data of an image can be easily controlled.

The multiplexer 413 receives the compressed previous image F'n−1 outputted from the read FIFO circuits 412_1 through to 412_N, and selectively outputs the compressed previous image F'n−1 in response to a data output selection signal (not shown).

Figure 5A:
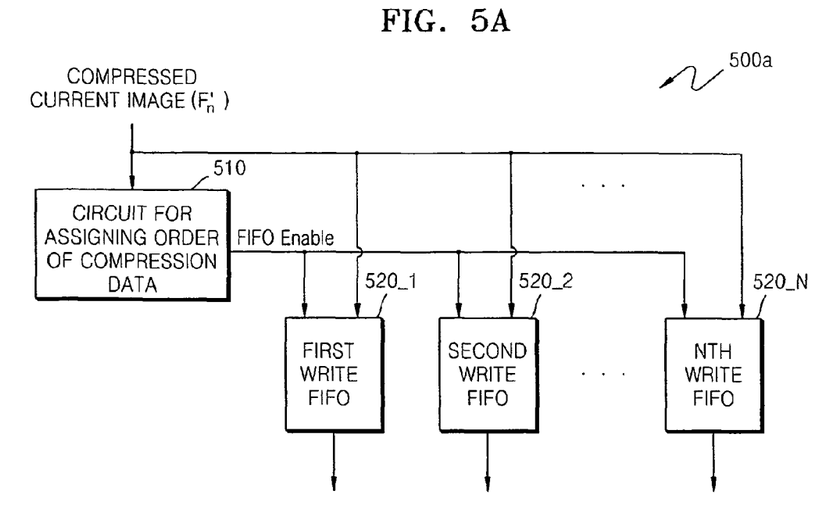
FIG. 5A is a block diagram illustrating an embodiment of a data flow controller according to another aspect of the present invention.

FIG. 5A is a block diagram illustrating an embodiment of a data flow controller 500$a$ according to another aspect of the present invention. As an example, the data flow controller 310 of FIG. 3 can take the form of data flow controller 500$a$ of FIG. 5A.

The data flow controller 500$a$ according to the current embodiment includes a circuit 510 for assigning an order of compression data and N write FIFO circuits 520_1 through to 520_N.

The circuit 510 for assigning the order of compression data receives the compressed current image F'n and distributes the compressed current image F'n to the write FIFO circuits 520_1 through to 520_N. The distribution is performed in units of bus width between an external graphic-source (not shown) and the system 500$a$ for compensating response speed. The graphic source could be any graphic source known in the art. For example, when the bus width is 32 bits or 64 bits, a current image is distributed in 32 bits or 64 bits in order to be sequentially inputted to the write FIFO circuits 520_1 through to 520_N.

As a detailed illustrative example, assume that the bus width is 32 bits and there are 5 write FIFO circuits, i.e., N=5 in this example. The circuit 510 for assigning the order of compression data inputs a first 32 bits received via the bus line to the first write FIFO circuit 520_1, and inputs a fifth 32 bits received via the bus line to the fifth write FIFO circuit 520_N. Then, the circuit 510 for assigning the order of compression data inputs a sixth 32 bits received via the bus line to the first write FIFO circuit 520_1.

Here, when data bits simultaneously received via the bus line is one data group, the compressed current image F'n is formed of a number of data groups corresponding to: (1 frame of data)/(bus width). For example, when 1 frame of data is 100 M bytes and the bus width is 4 bytes, the number of data groups is $25 \times 10^6$. Accordingly, when the number of write FIFO circuits is 5, $5 \times 10^6$ data groups are inputted to one write FIFO circuit in a predetermined time interval.

However, the data flow controller 500$a$ only transmits the compressed current image F'n received from an encoder (not shown, e.g., encoder 360 in FIG. 3) to a frame memory (not shown, e.g., frame memory controller 320 in FIG. 3), and thus the above described large capacity memory cannot be used. Accordingly, the circuit 510 for assigning the order of compression data outputs stored data of an image to a frame memory controller (not shown) using a FIFO enable signal, when the data of an image having a size that is equal to or greater than a predetermined size is stored in the write FIFO circuits 520_1 through to 520_N. Details thereof will be described below.

Figure 5B:
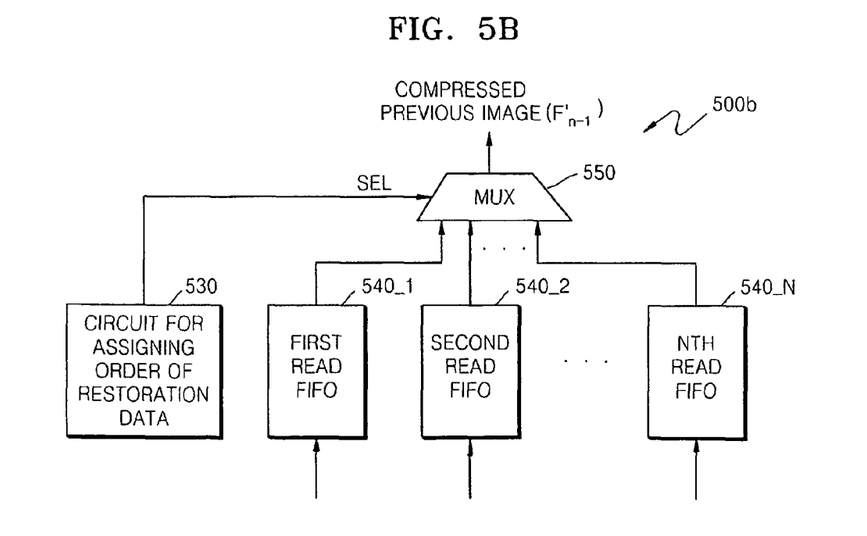
FIG. 5B is a block diagram illustrating an embodiment of a data flow controller according to another aspect of the present invention.

FIG. 5B is a block diagram illustrating an embodiment of a data flow controller 500$b$ according to another aspect of the present invention. As an example, the data flow controller 310 of FIG. 3 can take the form of data flow controller 500$b$ of FIG. 5B.

The data flow controller 500$b$ according to the current embodiment includes a circuit 530 for assigning an order of restoration data, N read FIFO circuits 540_1 through to 540_N, and a multiplexer 550.

Each of the read FIFO circuits 540_1 through to 540_N receives a compressed previous image F'n−1 outputted from a frame memory (not shown, e.g., frame memory 330 in FIG. 3). The compressed previous image F'n–1 is data outputted from sub frame memories (not shown) corresponding to each of the read FIFO circuits 540_1 through to 540_N. The compressed previous image F'n–1 outputted from the read FIFO circuits 540_1 through to 540_N is inputted to the multiplexer 550.

The size of the compressed previous image Fn'–1 inputted to one read FIFO circuit 540_1 is controlled by one frame memory controller (not shown). Similar to a write FIFO circuit (not shown, e.g., $1^{st}$ write FIFO 520_1 in FIG. 5A)), the memory capacity of the read FIFO circuit 540_1 is not large, and thus a frame memory controller (not shown, e.g., frame memory controller 320 in FIG. 3) transmits only the compressed previous image F'n–1 in a predetermined size to the read FIFO circuit 540_1.

Then, when the compressed previous image F'n–1 stored in one read FIFO circuit 540_1 is outputted, a corresponding sub frame memory controller (not shown) transmits a new previous image to the read FIFO circuit 540_1. Such an operation is performed after checking whether the compressed previous image F'n–1 inputted to the multiplexer 550 is outputted. Details thereof will be described below.

The circuit 530 for assigning the order of restoration data outputs a selection signal SEL to control operations of the multiplexer 550. The selection signal SEL assigns an order of outputting the compressed previous image F'n–1 from each of the FIFO circuits 540_1 through to 540_N.

Figure 6:
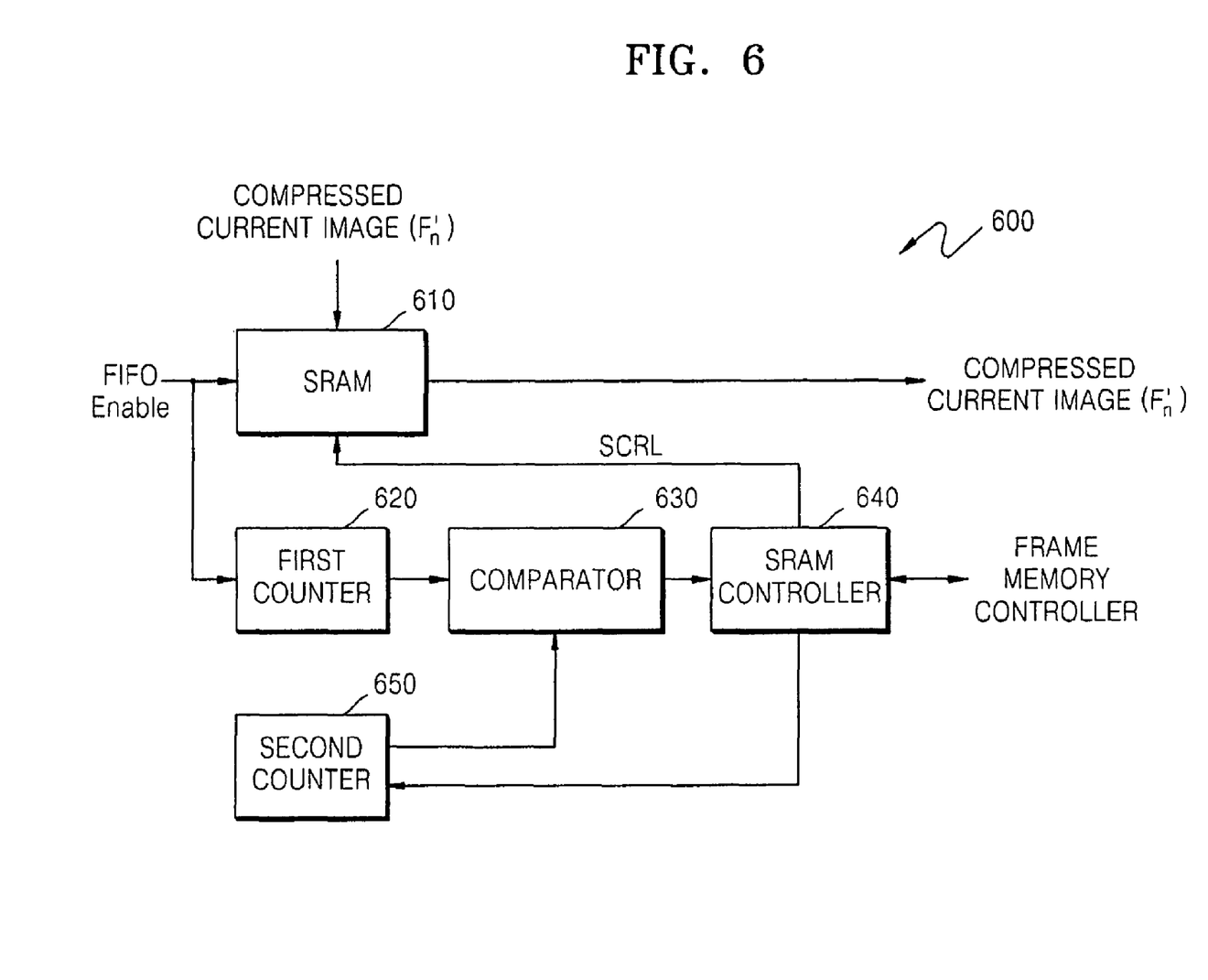
FIG. 6 is a block diagram illustrating an embodiment of a write first-in-first-out (FIFO) circuit according to an aspect of the present invention.

FIG. 6 is a block diagram illustrating an embodiment of a write FIFO circuit 600 according to an aspect of the present invention. As examples, the write FIFO circuits 411_1 through 411_N of FIG. 4 and the write FIFO circuits 520_1 through 520_N of FIG. 5A can take the form of write FIFO circuit 600 of FIG. 6.

The write FIFO circuit 600 according to the current embodiment includes a static random access memory (SRAM) 610, a first counter 620, a comparator 630, an SRAM controller 640, and a second counter 650.

In response to a FIFO enable signal; the SRAM 610 stores part of the frame data from among the data of a compressed current image F'n formed of a plurality of data groups. The FIFO enable signal is activated when one data group is inputted to the SRAM 610. The SRAM 610 outputs the stored part of the frame data in response to a control signal SCRL outputted from the SRAM controller 640.

The first counter 620 counts the number of sections, in which the FIFO enable signal is activated, and outputs the result to the comparator 630. The second counter 650 counts the number of sections, in which the control signal SCRL is activated, and outputs the result to the comparator 630.

Since each data group is inputted to the SRAM 610 in the sections, in which the FIFO enable signal is activated, the first counter 620 counts the number of data groups stored in the SRAM 610. Also, since each data group is outputted from the SRAM 610 in the sections, in which the control signal SCRL is activated, the second counter 650 counts the number of data groups outputted from the SRAM 610.

The comparator 630 compares the difference between the result outputted from the first counter 620 and the result outputted from the second counter 650 with a reference value. The reference value shows a suitable number of data groups that can be stored in the SRAM 610, which can be, for example, ½ of the maximum number of data groups that can be stored in the SRAM 610.

The SRAM controller 640 controls the SRAM 610 based on an output signal of the comparator 630. When the difference is equal to or below the reference value, the SRAM controller 640 outputs a deactivated control signal SCRL, and when the difference exceeds the reference value, the SRAM controller 640 outputs an activated control signal SCRL.

Figure 7:
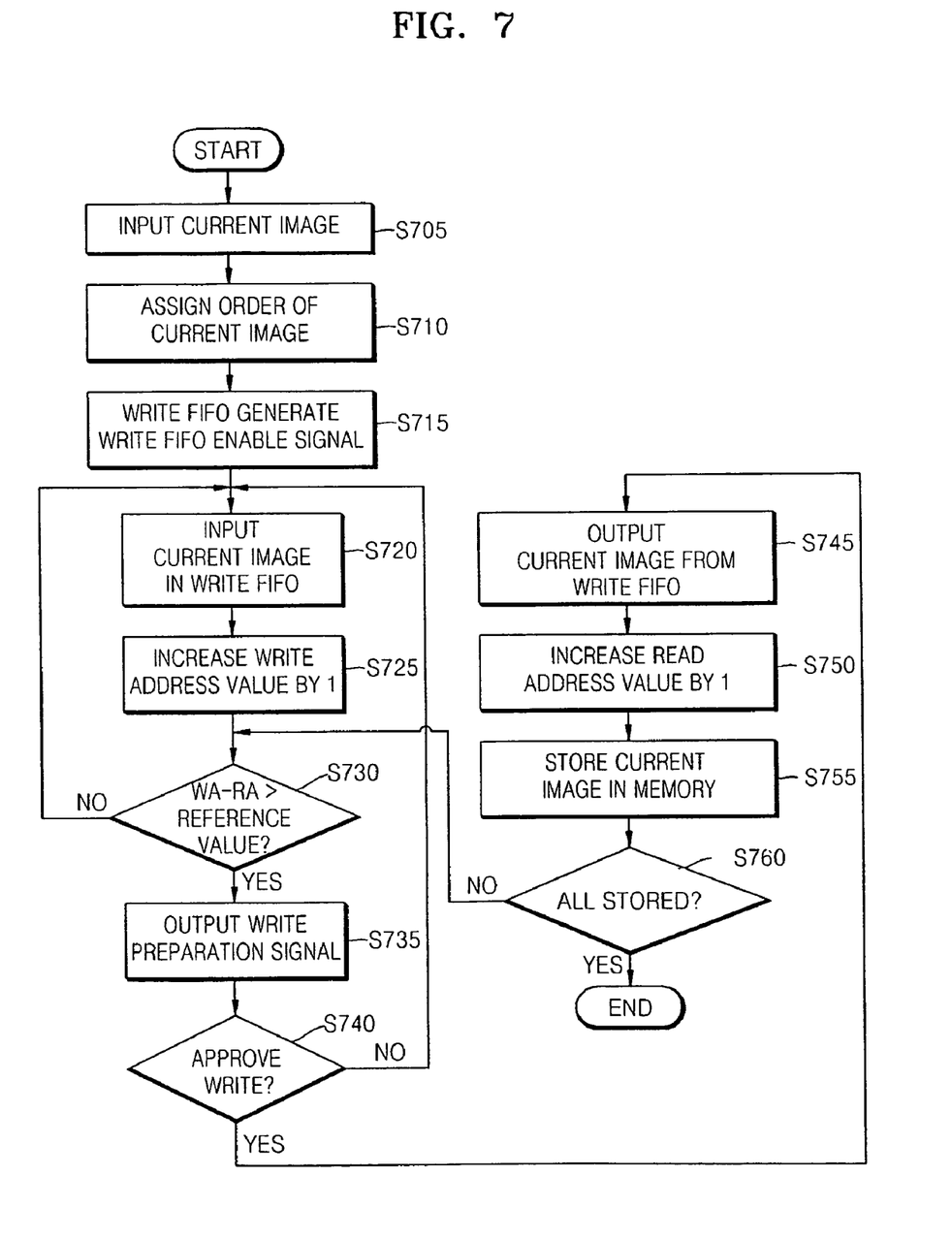
FIG. 7 is a flowchart illustrating an embodiment of a method of controlling operations of writing image frame data according to an aspect of the present invention.

FIG. 7 is a flowchart illustrating an embodiment of a method of controlling operations of writing image frame data according to an aspect of the present invention.

In operation S705, a current image is inputted from an external graphic source. The current image is inputted via a data bus line from the external graphic source. Accordingly, the current image is inputted in units of data bus width. Hereinafter, data inputted in one unit of data bus width is referred to as one data group.

In operation S710, an order of the current image is assigned. The order is an input order of the data groups. Accordingly, when the current image is 100 M bytes, the order of the last data group can be in the millions.

After assigning the order of each data group, a write FIFO circuit in which the data group is to be stored is assigned. For example, when there are 5 write FIFO circuits, the data groups that are to be stored in a first write FIFO circuit can be assigned to be first through to Mth data groups.

In operation S715, a write FIFO enable signal is generated. The write FIFO enable signal controls the time taken to input the data groups to each write FIFO circuit. In operation S720, a certain data group is inputted to a certain write FIFO circuit when the write FIFO enable signal activates.

When one data group is stored in a certain write FIFO circuit, a write address value WA is increased by 1 in operation S725. The write address value WA is the size of the current image stored in the write FIFO circuit.

In operation S730, it is determined whether a difference between the write address value WA and a read address value RA exceeds a reference value. The read address value RA is set to be 0. The reference value is determined based on the memory capacity of the write FIFO circuit.

When the difference is equal to or below the reference value, the current image is stored in the write FIFO circuit. When the difference exceeds the reference value, a write preparation signal is outputted in order to output the current image stored in the write FIFO circuit in operation S735.

When the data groups having at least a certain value is stored in the write FIFO circuit, the write preparation signal indicates that preparation for writing the data groups stored in the frame memory is complete.

In operation S740, a write approval signal, indicating whether the current image can be written in the frame memory, is outputted in response to the write preparation signal. Since a waiting time is required for a turn to store the data group in a certain write FIFO circuit, a waiting time is also required for a turn to output the stored data group.

When the deactivated write approval signal is outputted, the write FIFO circuit stores the received current image in operation S720. When the activated write approval signal is outputted, the write FIFO circuit outputs the stored current image in operation S745.

When one data group is outputted from a certain write FIFO circuit, the read address value RA is increased by 1 in operation S750. The outputted data group is stored in a sub frame memory corresponding to the certain write FIFO circuit in operation S755. Operations from S730 to S755 are repeated until the entire current image corresponding to 1 frame is stored in the frame memory in operation S760.

Figure 8:
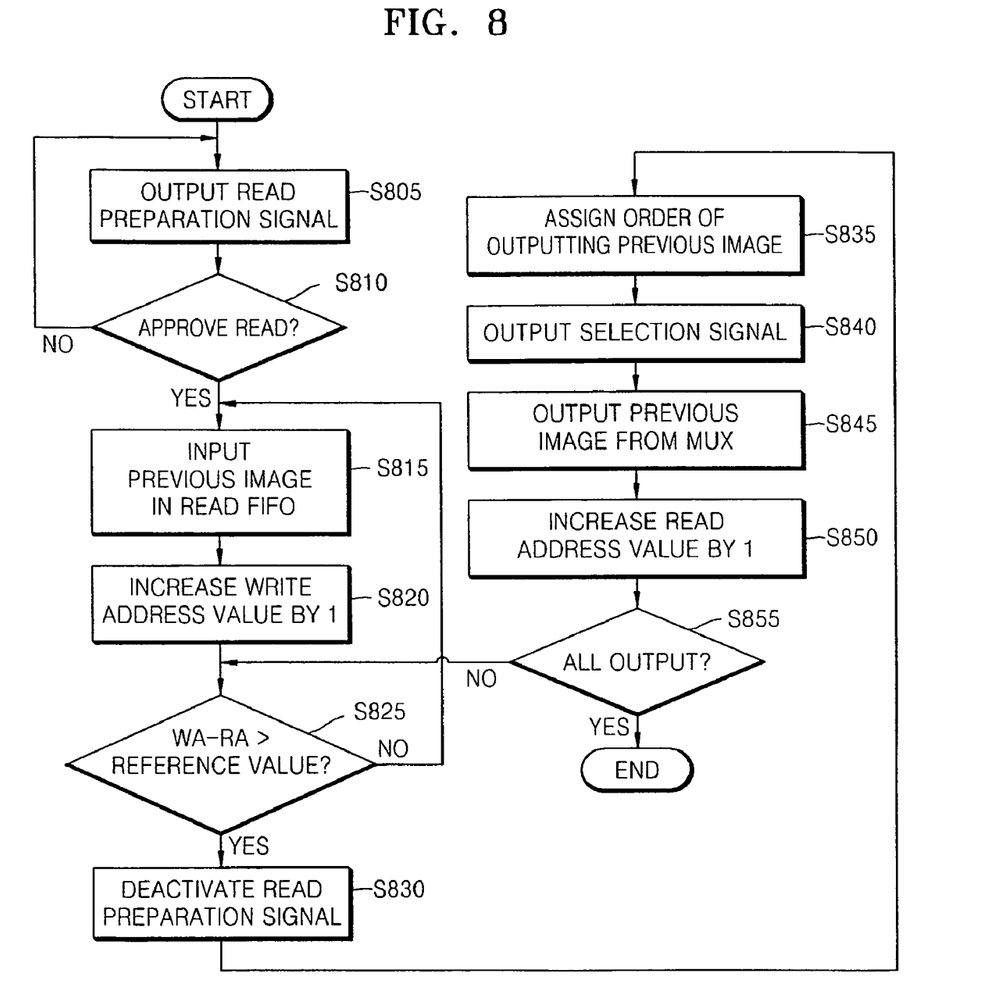
FIG. 8 is a flowchart illustrating an embodiment of a method of controlling operations of reading image frame data according to an aspect of the present invention.

FIG. 8 is a flowchart illustrating an embodiment of a method of controlling operations of reading image frame data according to an aspect of the present invention.

A read preparation signal, which indicates that a preparation for reading a previous image stored in a frame memory is complete, is outputted in operation S805. A read approval signal, which indicates whether the previous image can be read, is outputted in response to the read preparation signal in operation S810.

When the deactivated read approval signal is outputted, the read preparation signal is continuously outputted. When the activated read approval signal is outputted, the previous image stored in the frame memory is outputted to a corresponding read FIFO circuit in operation S815, and a write address value WA is increased by 1 in operation S820.

In operation S825, it is determined whether a difference between the write address value WA and a read address value RA exceeds a reference value. The read address value RA is set to be 0. The reference value is determined based on the memory capacity of the read FIFO circuit.

When the difference is equal to or below the reference value, the previous image is stored in the read FIFO circuit. When the difference exceeds the reference value, the read preparation signal is deactivated in operation S830.

Then, an output order of the previous image outputted from a multiplexer is assigned based on a control signal in operation S835. An output data selection signal generated according to the assigned output order is outputted in operation S840. The previous image is outputted according to the output data selection signal in operation S845.

Whenever each data group, forming at least a portion of the previous image, is outputted, the read address value RA is increased by 1 in operation S850. Operations from S825 to S850 are repeated until the entire previous image corresponding to 1 frame is outputted from the frame memory in operation S855.

Accordingly, the system for compensating response speed in accordance with aspects of the present invention uses an embedded memory as an internal frame memory, and thus the numbers of bus lines and pins can be decreased. Consequently, operation speed of the system is improved.

Also, by using the method of controlling frame data of an image in accordance with aspects of the present invention, frame data can be efficiently inputted to or outputted from a frame memory. Accordingly, installing more frame memories is convenient.

While the foregoing has described what are considered to be the best mode and/or other preferred embodiments, it will be understood by those of ordinary skill in the art that various changes in form and details can be made therein without departing from the spirit and scope of the present invention as defined by the following claims. It is intended by the following claims to claim that which is literally described and all equivalents thereto, including all modifications and variations that fall within the scope of each claim.

What is claimed is:

1. A response speed compensating system, comprising:
   a circuit for compensating response speed configured to compare voltages of a current image and a previous image received form an external source, the circuit configured to change a gray voltage of the current image according to the difference between a gray voltage of the previous image and the gray voltage of current image;
   an internal frame memory configured to store the current image and output the previous image in response to a control signal, the internal frame memory comprising N sub frame memories formed in a single chip with the circuit for compensating response speed, wherein N is a natural number;
   a frame memory controller configured to generate the control signal in order to store the current image in the internal frame memory and to output the previous image from the internal frame memory, the frame memory controller comprising N sub frame memory controllers corresponding to each sub frame memory; and
   an encoder configured to generate a compressed current image by compressing the current image;
   a first decoder configured to generate a restored previous image by restoring a compressed previous image; and
   a data flow controller configured to transmit the compressed current image to the frame memory controller and to transmit the compressed previous image to the circuit for compensating response speed, the data flow controller comprising N write FIFO circuits and N read FIFO circuits corresponding each of the N sub frame memories, wherein the data flow controller comprises:
   a circuit for assigning an order of compression data, and which is configured to divide the compressed current image into a plurality of data groups based on a data bus width of the compressed current image inputted to the data flow controller.

2. The system of claim 1,
   wherein the circuit for assigning an order of compression data is further configured to divide the compressed current image into the plurality of data groups according to an input order and to generate a FIFO enable signal in order to sequentially input the current image to the write FIFO circuits.

3. The system of claim 1, wherein the data bus width is 32 bits or 64 bits.

4. The system of claim 1, wherein the data flow controller is further configured to output the compressed current image to a corresponding sub frame memory controller, when the compress current image stored in the write FIFO circuits exceeds a predetermined value.

5. The system of claim 2, wherein a write FIFO circuit comprises:
   an SRAM configured to store the compressed current image;
   a first counter configured to count an input number of data group are inputted;
   a second counter configured to count an output number of data group are outputted;
   a comparator configured to compare the difference between the input number and the output number with a reference value; and
   an SRAM controller configured to control operations of the SRAM based on the result of the difference comparison.

6. The system of claim 5, wherein the reference value is an half of a maximum number of data group that can be stored in the SRAM.

7. The system of claim 2, wherein the data flow controller further comprises:
   a multiplexer configured to receive the compressed previous image outputted from the N read FIFO circuits, and to sequentially output the compressed previous image in response to an output data selection signal; and
   a circuit for assigning an order of restoration data configured to assign an output order of the compressed previous image inputted to the multiplexer and to generate the output data selection signal corresponding to the output order.

8. The system of claim 1, further comprising:
   a second decoder configured to output a restored current image by restoring the compressed current image outputted from the encoder; and a circuit configured to restore a previous image that generates a similar previous image by using the current image, the restored current image, and the restored previous image, wherein the circuit for compensating response speed is configured to compare voltages of the current image and similar previous image.

9. The system of claim 1, wherein the frame memory controller is formed on the single chip with the circuit for compensating response speed and the internal frame memory.

10. The system of claim 1, wherein the circuit for compensating response speed is a dynamic capacitance compensation (DCC) circuit.

11. The system of claim 10, wherein the DCC circuit comprises a look-up table configured to output the current image having the changed gray voltage by changing the current image based on the result of voltage comparison.

12. A method of controlling frame data of an image, the method comprising:
storing a current image in N write FIFO circuits connected in parallel after dividing the current image into a plurality of data groups, wherein N is a natural number;
storing the current image in N sub frame memories by outputting the current image from each of the N write FIFO circuits to the N sub frame memories, when the current image stored in the N write FIFO circuits exceeds a predetermined value;
storing a previous image in N read FIFO circuits connected in parallel by outputting the previous image from the N sub frame memories to N read FIFO circuits, when the previous image stored in the N sub frame memories exceeds a predetermined value;
outputting the previous image from the N read FIFO circuits to a circuit for compensating response speed in response to an output data selection signal;
outputting a read preparation signal indicating that preparation for reading the previous image in the N sub frame memories is completed;
outputting a read approval signal indicating that the previous image can be read from the N sub frame memories in response to the read preparation signal;
outputting the previous image stored in the N sub frame memories to the read FIFO circuits when the read approval signal is activated; and
outputting the read preparation signal instead of outputting the previous image stored in the N frame memories when the write approval signal is deactivated.

13. The method of claim 12, wherein the storing the current image in the N sub frame memories is performed by N sub frame memory controllers.

14. The method of claim 12, wherein the storing of the current image in the N write FIFO circuits comprises:
generating a FIFO enable signal to control storing the current image in N sub frame memories; and
storing the current image in N write FIFO circuits in response to the FIFO enable signal.

15. The method of claim 14, further comprising:
counting an input number of data groups inputted to the write FIFO circuits;
counting an output number of data groups outputted from the write FIFO circuits;
determining whether the difference between the input number and the output number is bigger than a predetermined reference value; and
outputting the data group stored in the write FIFO circuits based on the result the determination.

16. The method of claim 15, wherein outputting the data group stored in the write FIFO circuit based on the result the determination comprises:
outputting the data group stored in the write FIFO circuits when the difference exceeds the predetermined reference value.

17. The method of claim 12, further comprising:
outputting a write preparation signal indicating that preparation for writing the current image in the N sub frame memories is completed; and
outputting a write approval signal indicating that the current image can be written in the N sub frame memories in response to the write preparation signal.

18. The method of claim 17, further comprising:
outputting the current image stored in the write FIFO circuits when the write approval signal is activated; and
storing the current image in the write FIFO circuits, when the write approval signal is deactivated.

19. The method of claim 12, further comprising:
counting an input number of data groups inputted to the read FIFO circuits;
counting an output number of data groups outputted from the read FIFO circuits;
determining whether the difference between the input number and the output number is bigger than a predetermined reference value; and
outputting the previous image stored in the N sub frame memories based on the result the determination.

20. The method of claim 19, wherein outputting the previous image stored in the N sub frame memories comprises;
outputting the previous stored in the N sub frame memories when the difference exceeds the predetermined reference value.

* * * * *